O. POOLE.
STOVE-PIPE DAMPER.

No. 185,404. Patented Dec. 19, 1876.

Attest.
Mc. Mc. Converse
O. B. Williams.

Inventor.
Oscar Poole
By B. C. Converse
Atty.

THE GRAPHIC CO. N.Y.

UNITED STATES PATENT OFFICE.

OSCAR POOLE, OF SPRINGFIELD, OHIO.

IMPROVEMENT IN STOVE-PIPE DAMPERS.

Specification forming part of Letters Patent No. 185,404, dated December 19, 1876; application filed September 9, 1876.

*To all whom it may concern:*

Be it known that I, OSCAR POOLE, of the city of Springfield, county of Clarke, and State of Ohio, have invented certain new and useful Improvements in Dampers for Stove and other Pipes, of which the following is a full, exact, concise, and complete specification:

My invention relates to a damper for stove and other pipes, constructed with a single bearing in one side only of the pipe-section.

The object of my invention is the construction of a more perfect-working damper, simple, durable, and less liable to get out of order than those at present in use, easier applied, and without any liability of being jammed or clogged in its movements. My damper, with its bearing-collar and shank, is cast in a single piece.

Figure 1:
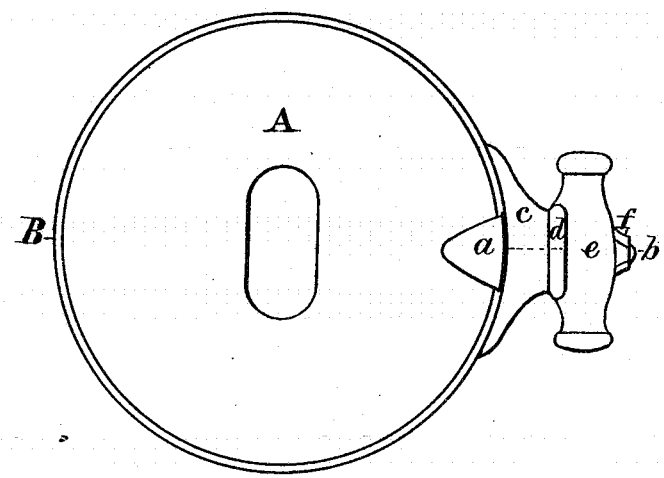
Figure 2:
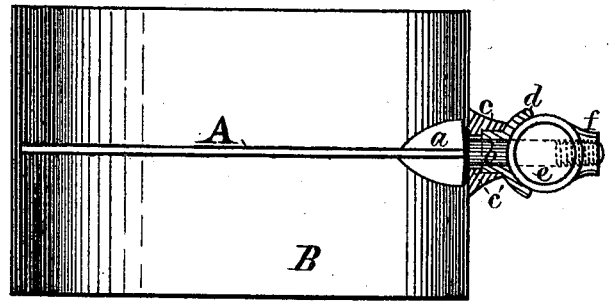

Figure 1 is a plan view of my improved damper attached to a pipe-section, the end only of the latter being shown. Fig. 2 is a longitudinal section of the pipe, with an edge view of the damper. The clamping-collar of the pipe and that of the handle are shown in cross-section.

A is the blade or valve of the damper; B, the pipe. $a$ is the collar-bearing of the valve A. It is cast on it, is conical in shape, with a convex base, to allow it to be easily turned in the concavity of the pipe. The base is large enough to give it a sufficiently firm bearing. $b$ is the shank of the valve or damper A, which is square, except at the end, which is threaded to receive a nut, for securing the handle and its several parts together. $c$ is a segmental collar, which extends partially around the pipe at the bearing-point, clamping it firmly when the washer $d$ and handle $e$ are attached.

In applying my improved damper, a single hole is punched in one side of the pipe, and the shank $b$ of the damper inserted through it from the inside. The segmental collar, which has a round hole in it, is then slipped over the shank on the outside of the pipe. This collar has a deep recess, $c'$, around its central hole, both the hole and its recess being round—the former to allow the shank to turn in it, and the latter to allow that part of the washer $d$ which projects into said recess to turn also.

The outer part next handle $e$ (of washer $d$) is made concave, to give the handle a good firm support. (See cross-section, Fig. 2.) The latter is slipped on the shank $b$ and secured by the nut $f$. The segmental collar $c$, fitting closely around that portion of the pipe, from its circular shape, is prevented from turning, and does not require rivets or other fastenings to secure it in its position.

I claim as my improvement—

1. The clamping-collar $c$, having a deep recess, $c'$, for the reception of the projecting washer $d$, as a means of preventing it from coming in contact with the pipe B while rotating the valve A, constructed substantially as described.

2. As an article of manufacture, the damper constructed substantially as hereinbefore described, consisting of the valve A, with a collar-bearing, $a$, having a convex base, a clamping-collar, $c$, with a deep recess, $c'$, in the same, the washer $d$, with a projecting part extending into said recess, and provided with a concave bearing on its outer end as a means of more firmly supporting the handle $e$ upon the shank $b$, as and for the purpose hereinbefore set forth.

OSCAR POOLE.

Attest:
 B. C. CONVERSE,
 M. M. CONVERSE.